US012224795B2

United States Patent
Shitaba et al.

(10) Patent No.: US 12,224,795 B2
(45) Date of Patent: Feb. 11, 2025

(54) OPTICAL TRANSMISSION SYSTEM AND TRANSMISSION QUALITY MONITORING METHOD

(71) Applicant: NIPPON TELEGRAPH AND TELEPHONE CORPORATION, Tokyo (JP)

(72) Inventors: Toshiaki Shitaba, Musashino (JP); Tomoaki Yoshida, Musashino (JP); Akihiro Tanabe, Musashino (JP); Takashi Mitsui, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 110 days.

(21) Appl. No.: 18/016,367

(22) PCT Filed: Jul. 30, 2020

(86) PCT No.: PCT/JP2020/029237
§ 371 (c)(1),
(2) Date: Jan. 16, 2023

(87) PCT Pub. No.: WO2022/024293
PCT Pub. Date: Feb. 3, 2022

(65) Prior Publication Data
US 2023/0275658 A1 Aug. 31, 2023

(51) Int. Cl.
*H04B 10/077* (2013.01)
*H04B 10/40* (2013.01)
(Continued)

(52) U.S. Cl.
CPC ......... *H04B 10/077* (2013.01); *H04B 10/614* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS 5,101,450 A * 3/1992 Olshansky .......... H04J 14/0298
385/40
5,777,761 A * 7/1998 Fee .................... H04J 14/0295
398/1
(Continued)

OTHER PUBLICATIONS

"ITU-T J.185: Transmission equipment for transferring multi-channel television signals over optical access networks by frequency modulation conversion", International Telecommunication Union, Jun. 2012.

*Primary Examiner* — Darren E Wolf

(57) ABSTRACT

In an optical transmission system including a plurality of optical transmitting units and a relay device, the plurality of optical transmitting units include a frequency modulation conversion unit that converts an input signal into a frequency modulation signal through frequency modulation conversion processing, a multiplexing unit that multiplexes monitoring signals with different frequencies with the frequency modulation signal, and an optical modulation unit that converts the frequency modulation signal that is an electric signal in which the monitoring signals are multiplexed into optical signals having different wavelengths, and the relay device includes a photoelectric conversion unit that acquires a combined signal obtained by combining optical signals having different wavelengths from each other and converts the combined signal into an electric signal, and a measuring unit that measures transmission quality of the plurality of monitoring signals included in the electric signal.

9 Claims, 6 Drawing Sheets

(51) Int. Cl.
*H04B 10/50* (2013.01)
*H04B 10/60* (2013.01)
*H04B 10/61* (2013.01)

(56) References Cited

U.S. PATENT DOCUMENTS

| | | | | |
|---|---|---|---|---|
| 6,118,566 | A * | 9/2000 | Price | H04J 14/0298 |
| | | | | 398/1 |
| 6,483,624 | B1 * | 11/2002 | Otani | G02F 1/0121 |
| | | | | 398/154 |
| 6,690,884 | B1 * | 2/2004 | Kelty | H04B 10/695 |
| | | | | 714/704 |
| 2004/0202480 | A1 * | 10/2004 | Weid | H04B 10/2569 |
| | | | | 398/147 |
| 2004/0208614 | A1 * | 10/2004 | Price | H04B 10/505 |
| | | | | 398/152 |
| 2005/0069013 | A1 * | 3/2005 | Bhandarkar | H01S 5/02208 |
| | | | | 398/43 |

* cited by examiner

OPTICAL TRANSMISSION SYSTEM AND TRANSMISSION QUALITY MONITORING METHOD

CROSS-REFERENCE TO RELATED APPLICATIONS

This application is a 371 U.S. National Phase of International Application No. PCT/JP2020/029237, filed on Jul. 30, 2020. The entire disclosure of the above application is incorporated herein by reference.

TECHNICAL FIELD

The present invention relates to an optical transmission system and a transmission quality monitoring method.

BACKGROUND ART

A Fiber to the Home (FTTH)) cable television (CATV) system, for example, is known as a network system for distributing videos to subscribers' homes. In the FTTH CATV system, for example, a frequency modulation (FM) conversion method is used as an optical transmission method (see NPL 1). For video distribution in Japan, there are broadcasting satellite (BS) broadcasts, 110-degree communication satellite (CS) broadcasts, terrestrial digital broadcasts, and so on distributed from satellites to the ground using right-handed circularly polarized waves.

In addition, BS broadcasts (having an intermediate frequency of 2224 to 2681 [MHz]) and 110-degree CS broadcasts (having an intermediate frequency of 2748 to 3224 [MHz]) distributed from satellites to the ground using left-handed circularly polarized waves were launched as new 4K/8K satellite broadcasts in December 2018 in Japan. The intermediate frequencies used in the new 4K/8K satellite broadcasts differ from the intermediate frequencies that are used in the existing broadcasting. For this reason, if the existing broadcasting facility does not support the intermediate frequencies for the new 4K/8K satellite broadcasting, distribution and viewing of the new 4K/8K satellite broadcasts cannot be realized using the existing broadcasting facility alone. As one method for further enabling distribution and viewing of the new 4K/8K satellite broadcasts in addition to distribution and viewing of existing broadcasts, a method of adding a facility that supports the new 4K/8K satellite broadcasts to the existing networks, apart from the existing broadcasting facility, can be considered.

In an optical transmission system, the section from an optical transmitting unit to an optical amplifier included in a relay amplifier may be made redundant with an operation system and a standby system, as in an optical video distribution system that uses the FM conversion method described in NPL 1, for example. In this case, generally, the quality monitoring section provided in the relay amplifier monitors the signal quality. The relay amplifier switches from the operation system to the standby system when a monitoring value indicating the signal quality is equal to or less than a predetermined threshold. With such a configuration, a video distribution service provided by the optical video distribution system is maintained.

CITATION LIST

Non Patent Literature

[NPL 1] "ITU-T J.185: Transmission equipment for transferring multi-channel television signals over optical access networks by frequency modulation conversion," International Telecommunication Union, June 2012.

SUMMARY OF INVENTION

Technical Problem

For example, as in the FTTH CATV system described above in which a facility for existing broadcasting and a facility that supports the new 4K/8K satellite broadcasting are separately installed, there is a network configuration in which one relay network is shared for transmission of optical signals having two different wavelengths. In the case where the above-mentioned redundancy is realized in such a network configuration, the signal quality is monitored by a quality monitoring unit corresponding to each wavelength. However, in this case, it is necessary to provide a quality monitoring unit for each wavelength in the relay amplifier. For this reason, there are problems that device cost for the relay amplifiers increases, and a wider installation space is required.

In view of the above circumstances, an object of the present invention is to provide an optical transmission system and a transmission quality monitoring method capable of measuring transmission quality for each wavelength without providing a quality monitoring unit for each wavelength.

Solution to Problem

An aspect of the present invention is an optical transmission system including a plurality of optical transmitting units (optical transmitters) and a relay device, in which the plurality of optical transmitting units include a frequency modulation conversion unit (a frequency modulation converter) that converts an input signal into a frequency modulation signal through frequency modulation conversion processing, a multiplexing unit (a multiplexer) that multiplexes monitoring signals with different frequencies with the frequency modulation signal, and an optical modulation unit (an optical modulator) that converts the frequency modulation signal that is an electric signal in which the monitoring signals are multiplexed into optical signals having different wavelengths, and the relay device includes a photoelectric conversion unit (a photoelectric converter) that acquires a combined signal obtained by combining optical signals having different wavelengths from each other and converts the multiplexed signal into an electric signal, and a measuring unit (a measuring instrument) that measures transmission quality of the plurality of monitoring signals included in the electric signal.

In addition, an aspect of the present invention is a transmission quality monitoring method including a frequency modulation conversion step in which a plurality of optical transmitting units convert an input signal into a frequency modulation signal through frequency modulation conversion processing, a multiplexing step in which the plurality of optical transmitting units multiplex monitoring signals with different frequencies with the frequency modulation signal, an optical modulation step in which the plurality of optical transmitting units convert the frequency modulation signal that is an electric signal in which the monitoring signals are multiplexed into optical signals having different wavelengths, a photoelectric conversion step in which a relay device acquires a combined signal obtained by combining the optical signals having the different wavelengths and converts the combined signal into an electric signal, and a measurement step in which the relay device measures transmission quality of the plurality of monitoring signals included in the electric signal.

Advantageous Effects of Invention

According to the present invention, transmission quality for each wavelength can be measured without providing a quality monitoring unit for each wavelength.

DESCRIPTION OF EMBODIMENTS

Embodiment

Hereinafter, an optical transmission system and a transmission quality monitoring method according to an embodiment of the present invention will be described with reference to the drawings. In order to make the description easy to understand, a configuration of an optical transmission system of the related art will be described for comparison.

An FTTH CATV system is known as a network system for distributing videos to subscribers' homes.

Figure 1:
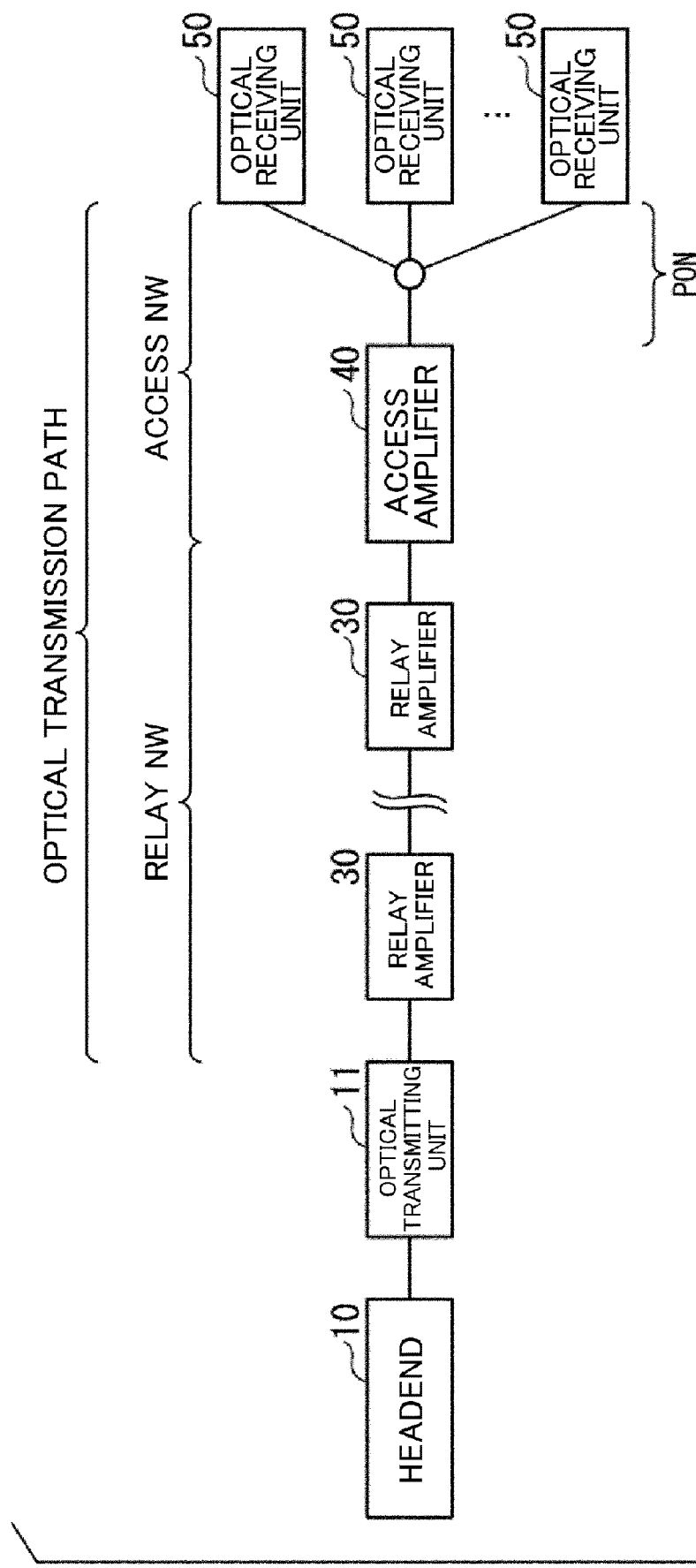
FIG. 1 is a block diagram showing an example of a network configuration of an FTTH CATV system of the related art.

FIG. 1 is a block diagram showing an example of a network configuration of the FTTH CATV system of the related art. The FTTH CATV system of the related art is configured to include, for example, a headend 10, an optical transmitting unit 11, relay amplifiers 30, an access amplifier 40, and a plurality of optical receiving units 50 (optical receiver) installed in subscribers' homes as shown in FIG. 1.

The headend 10 receives radio waves that carry video signals transmitted from a broadcasting station via a transmission tower on the ground, a satellite, and the like. The headend 10 adjusts amplification or the like of the received radio waves. Then, the headend 10 outputs electric signals indicating corresponding the video signals to the optical transmitting unit 11. The optical transmitting unit 11 converts the acquired electric signals into optical signals. The optical transmitting unit 11 sends out the corresponding optical signals to an optical transmission path constructed with optical fibers.

The optical transmission path is divided into a relay network (referred to as a "relay NW" below) section and an access network (referred to as an "access NW") section.

The relay NW is a communication network that connects the optical transmitting unit 11 to the access NW. The relay amplifiers 30 functioning as amplifiers are provided in multiple stages on the relay NW in a case where the transmission distance is long, or the like. Each of the relay amplifiers 30 amplifies the received optical signals. Each of the relay amplifiers 30 sends out the amplified optical signal to another relay amplifier 30 in the subsequent stage or sends out the amplified optical signal to a device within the access NW section. Alternatively, each of the relay amplifiers 30 splits the amplified optical signal using an optical coupler and sends it out to both of another relay amplifier 30 in the subsequent stage and the device within the access NW section.

Meanwhile, the access NW is a communication network that connects the relay NW to each of the optical receiving units 50 that terminate optical signals. A passive optical network (PON) configuration is generally applied to the access NW in order to divide optical signals output from the relay NW to the optical receiving units 50 installed in a plurality of subscribers' homes. Furthermore, there may be cases where the access amplifier 40 that functions as an amplifier is also used in the access NW for the purpose of compensating for loss resulting from division of optical signals in the PON configuration, loss resulting from splitting of optical signals by the relay amplifiers 30, and the like, as shown in FIG. 1.

In the FTTH CATV system of the related art with the above-described network configuration, for example, the FM conversion method is used as an optical transmission method. The optical transmitting unit 11 receives frequency-multiplexed electric signals for a multi-channel video that is output from the headend 10. The optical transmitting unit 11 converts the frequency-multiplexed electric signals for the multi-channel video into a single-channel broadband FM signal in a batch. Furthermore, the optical transmitting unit 11 converts the FM signal into an optical signal having a single wavelength λ by means of intensity modulation, and sends out the optical signal to an optical transmission path.

Meanwhile, the optical receiving units 50 receive the optical signal having the wavelength λ. The optical receiving units 50 convert the received optical signal into a broadband FM signal through photoelectric conversion and demodulate the signal. Thus, the optical receiving units are able to extract a frequency-multiplexed electric signal for a multi-channel video from the received optical signal.

In Japan, distribution of multi-channel videos was realized using the above-described network configuration and optical transmission method of the related art. Examples of videos to be distributed include terrestrial digital broadcasting or the like in addition to BS broadcasting and 110-degree CS broadcasting for distribution from a satellite to the ground by using right-handed circularly polarized waves. Furthermore, BS broadcasting and 110-degree CS broadcasting for distribution from a satellite to the ground using left-handed circularly polarized waves was launched as new 4K/8K satellite broadcasting in December 2018.

The intermediate frequencies used in the new 4K/8K satellite broadcasting differ from the intermediate frequencies that are used in the existing broadcasting. For this reason, if the existing broadcasting facility does not support the intermediate frequencies of the new 4K/8K satellite broadcasting, distribution and viewing of the new 4K/8K satellite broadcasts cannot be realized using the existing broadcasting facility alone. As one method for further realizing distribution and viewing of the new 4K/8K satellite broadcasts in addition to distribution and viewing of the existing broadcasts, a method of installing the facility that supports the new 4K/8K satellite broadcasts separate from the existing broadcasting facility can be considered.

Figure 2:
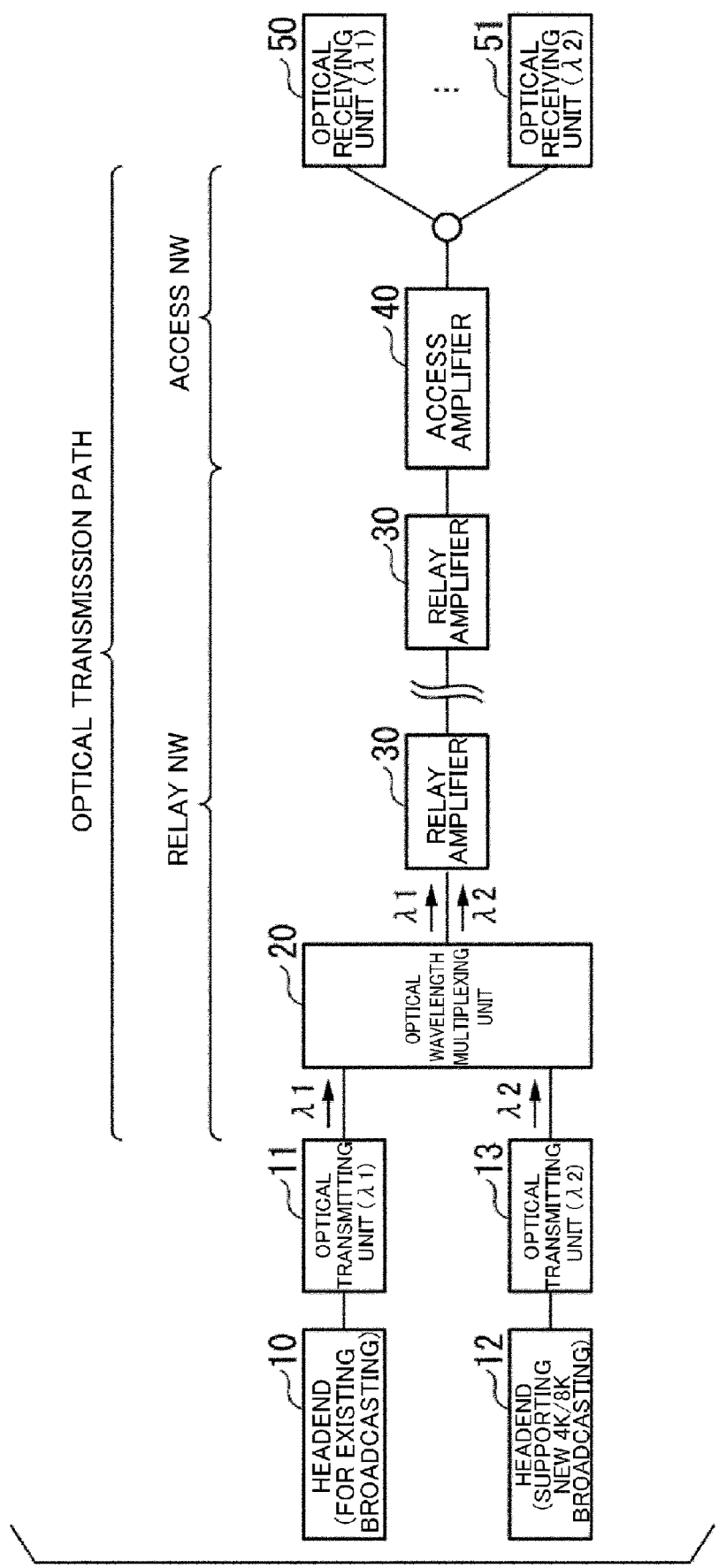
FIG. 2 is a block diagram showing an example of a network configuration when a new broadcasting facility is installed separately from an existing broadcasting facility.

FIG. 2 is a block diagram showing an example of a network configuration in the case of using this method. In this network configuration, a headend 12 corresponding to the new 4K/8K satellite broadcasting, an optical transmitting unit 13 (an optical transmitter) corresponding to the new 4K/8K satellite broadcasting, and an optical wavelength multiplexing unit 20 (an optical wavelength multiplexer) are newly installed in addition to the network configuration shown in FIG. 1 as shown in FIG. 2. The optical wavelength multiplexing unit 20 is, for example, a wavelength division multiplexing (WDM) filter.

Further, it is assumed here that the relay amplifiers 30 already support the new 4K/8K satellite broadcasting. In addition, the network is assumed to be configured such that an optical signal for existing broadcasting and an optical signal for the new 4K/8K satellite broadcasting are capable of reaching the access amplifier 40 at a desired signal level on the existing optical transmission path.

The optical wavelength multiplexing unit 20 (e.g., a filter circuit such as a WDM filter) combines an optical signal output from the optical transmitting unit 11 for existing broadcasting and an optical signal output from the optical transmitting unit 11 and an optical transmitting unit 13 that supports the new 4K/8K satellite broadcasting, and sends out the combined optical signal (referred to as a "combined signal" below) to the relay amplifiers 30. Here, the wavelength of the light output from the optical transmitting unit 11 for existing broadcasting is assumed to be a wavelength $\lambda 1$. In addition, the wavelength of the light output from the optical transmitting unit 13 that supports the new 4K/8K satellite broadcasting is assumed to be a wavelength $\lambda 2$. Furthermore, the wavelength $\lambda 1$ and the wavelength $\lambda 2$ are different wavelengths.

Here, there may be a case where the optical receiving unit 50 for existing broadcasting can receive the optical signal having the wavelength $\lambda 1$ but cannot receive the optical signal having the wavelength $\lambda 2$. To enable viewers to view the new 4K/8K satellite broadcasts in such a case, an optical receiving unit 51 capable of receiving the optical signal having the wavelength $\lambda 2$ needs to be newly installed in subscribers' homes. Further, if an optical receiving unit capable of receiving an optical signal having the wavelength $\lambda 1$ as well as an optical signal having the wavelength $\lambda 2$ is used as the newly installed optical receiving unit 51, viewers can watch both the existing broadcasts and the new 4K/8K satellite broadcasts using only the newly installed optical receiving unit 51.

In addition, according to the above network configuration, the network facility for the existing broadcasts can also be used, and thus the device cost required to realize distribution and viewing of the new 4K/8K satellite broadcasts can be reduced.

In addition, the optical video distribution system that uses the FM conversion method described in the NPL 1 has the redundant section from the optical transmitting unit 11 to the optical amplifiers included in the relay amplifiers 30.

Figure 3:
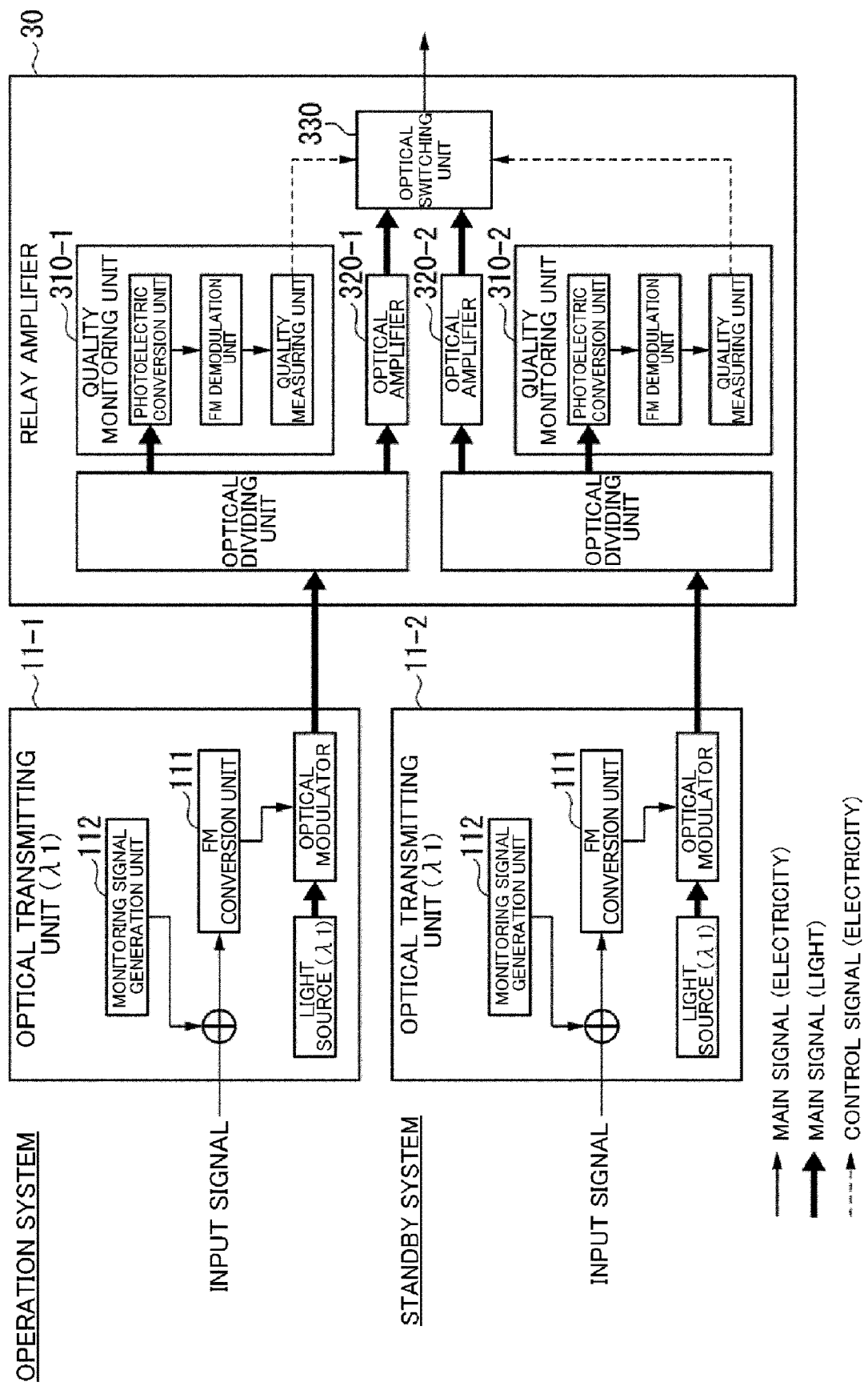
FIG. 3 is a block diagram showing an example of a configuration of an optical transmission system using a redundant FM conversion method of the related art.

FIG. 3 is a block diagram showing an example of a configuration of an optical transmission system using a redundant FM conversion method of the related art. In the optical transmission system, the section from the optical transmitting units 11 (11-1 and 11-2) (optical transmitters) to optical amplifiers 320 (320-1 and 320-2) and quality monitoring units 310 (310-1 and 310-2) included in the relay amplifier 30 is made redundant with an operation system and a standby system as shown in FIG. 3.

The quality monitoring units 310 (310-1 and 310-2) included in the relay amplifier 30 monitor signal quality. Generally, when a monitoring value of signal quality is equal to or less than a predetermined threshold in the quality monitoring unit 310-1 of the operation system, an optical switching unit 330 included in the relay amplifier 30 switches from the operation system to the standby system. Thus, the video distribution service by the optical video distribution system is maintained.

Figure 4:
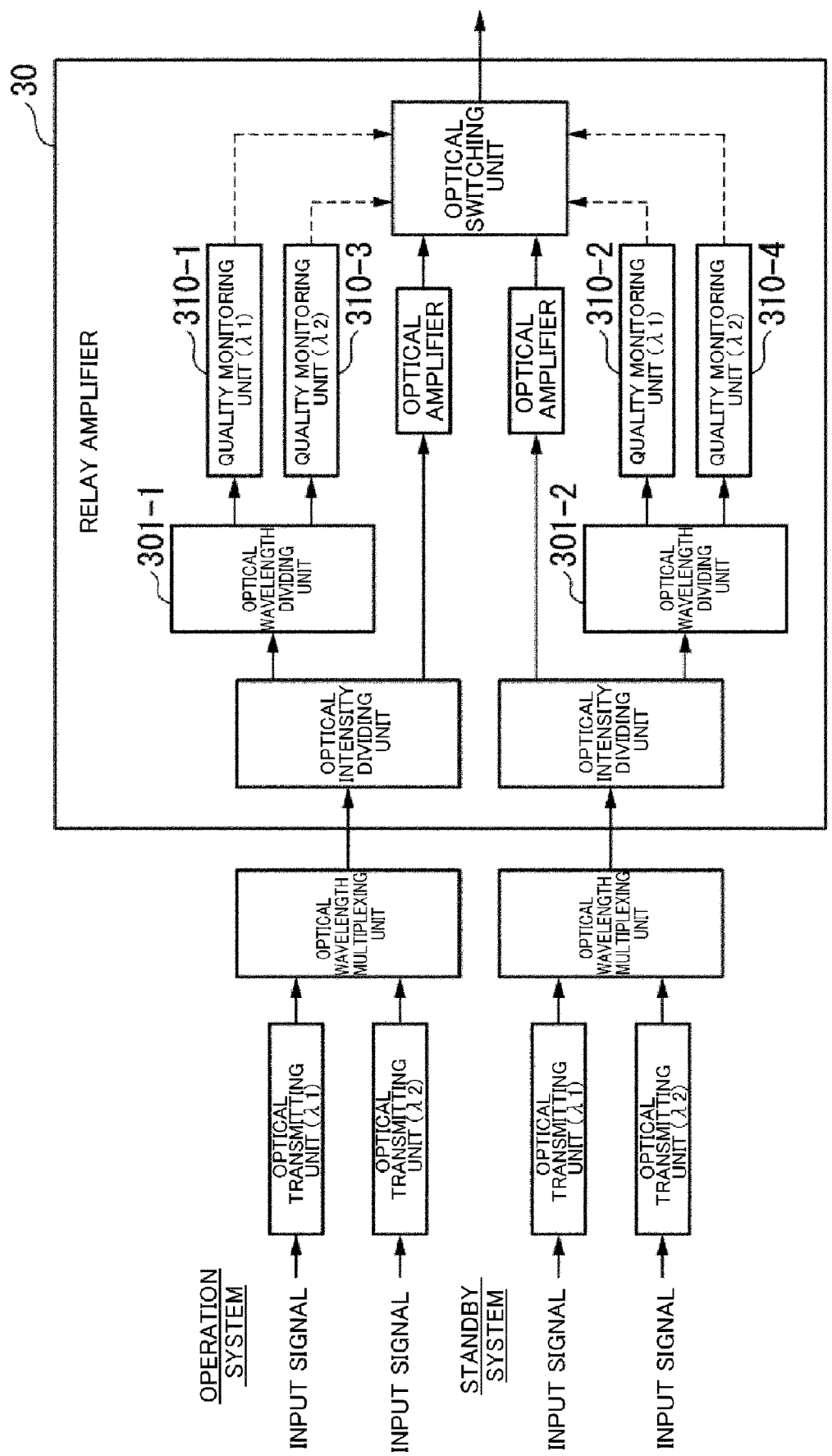
FIG. 4 is a block diagram showing an example of a configuration of an optical transmission system using a redundant FM conversion method for a plurality of wavelengths of the related art.

When the optical transmission system is made redundant as shown in FIG. 3 described above for a network configuration in which one relay NW is shared for transmission of optical signals having two wavelengths as in the network configuration shown in FIG. 2 described above, for example, a system configuration as shown in FIG. 4 may be considered.

FIG. 4 is a block diagram showing an example of a configuration of an optical transmission system using a redundant FM conversion method for a plurality of wavelengths. Optical wavelength dividing units 301 (301-1 and 301-2) are provided in the previous stage of the quality monitoring units 310 (310-1 and 310-3, and 310-2 and 310-4) included in the relay amplifier 30 as shown in FIG. 4. The optical wavelength dividing units 301 (301-1 and 301-2) separate two wavelengths. The two separated wavelengths (wavelength $\lambda 2$ and wavelength $\lambda 2$) are monitored for signal quality by the quality monitoring units 310, (310-1 and 310-3, and 310-2 and 310-4) respectively, corresponding to the wavelengths.

However, in this case, it is necessary to provide the quality monitoring units 310 (310-1 and 310-3, and 310-2 and 310-4) for each wavelength. For this reason, the device cost for the relay amplifier 30 increases, and a wider installation space for the relay amplifier 30 is required.

An optical transmission system in the present embodiment will be described below. According to the optical transmission system of the present embodiment, transmission quality of each wavelength can be measured without providing a quality monitoring unit for each wavelength. Thus, the low-cost and space-saving relay amplifier can be realized.

[Network Configuration]

A network configuration of the optical transmission system according to the present embodiment is a network configuration shown in FIG. 2 described above, in which one relay NW is shared for transmission of optical signals having two different wavelengths. The network configuration will be described with reference to FIG. 2.

The optical transmission system in the present embodiment is an FTTH CATV system that supports the new 4K/8K satellite broadcasting. The optical transmission system is configured to include a headend 10, an optical transmitting unit 11, a headend 12, an optical transmitting unit 13, an optical wavelength multiplexing unit 20, a plurality of relay amplifiers 30, an access amplifier 40, a plurality of optical receiving units 50, and a plurality of optical receiving units 51 as shown in FIG. 2. Further, the number of relay amplifiers 30 may be one. In addition, the plurality of optical receiving units 50 and the plurality of optical receiving units 51 may each be one.

The headend 10 is a headend for existing broadcasting. The headend 10 receives a radio wave carrying a video signal for the existing broadcasting transmitted from a broadcasting station via a transmission tower on the ground, a satellite, or the like. The headend 10 adjusts amplification or the like of the received radio wave. Then, the headend 10 sends out an electric signal indicating the corresponding video signal to the optical transmitting unit 11.

The optical transmitting unit 11 is an optical transmitting unit for existing broadcasting. The optical transmitting unit 11 receives the electric signal sent out from the headend 10. The optical transmitting unit 11 converts the received electric signal into an optical signal having a wavelength $\lambda 1$. Then, the optical transmitting unit 11 sends out the corresponding optical signal to an optical transmission path constructed with optical fibers.

The headend 12 is a headend that supports the new 4K/8K satellite broadcasting. The headend 12 receives a radio wave carrying a video signal for the new 4K/8K satellite broadcasting transmitted from a broadcasting station via a transmission tower on the ground, a satellite, or the like. The headend 12 adjusts amplification or the like of the received radio wave. Then, the headend 21 sends out an electric signal indicating the video signal to the optical transmitting unit 13.

The optical transmitting unit 13 is an optical transmitting unit that supports the new 4K/8K satellite broadcasting. The optical transmitting unit 13 converts the received electric signal into an optical signal having a wavelength $\lambda 2$. Then, the optical transmitting unit 13 sends out the corresponding optical signal to the optical transmission path.

Here, the wavelength $\lambda 1$ and the wavelength $\lambda 2$ are different wavelengths.

The optical transmission path is divided into a section of a relay NW and a section of an access NW. The relay NW is a communication network connecting the optical transmitting unit 11 and the access NW, and the optical transmitting unit 13 and the access NW. The access NW is a communication network connecting the relay NW and the optical receiving units 50 and the optical receiving units 51, and connecting the relay NW and the optical receiving units 50 and the optical reception units 51, respectively.

The relay NW is constituted by an optical wavelength multiplexing unit 20 and the relay amplifiers 30 constituted in multiple stages.

Further, it is assumed here that the relay amplifier 30 already support not only the existing broadcasting but also the new 4K/8K satellite broadcasting. In addition, the network is assumed to be configured such that an optical signal for existing broadcasting and an optical signal for the new 4K/8K satellite broadcasting are capable of reaching the access amplifier 40 at a desired signal level on the existing optical transmission path.

The relay amplifier 30 is a general optical fiber amplifier used in optical communication, for example, an erbium-doped fiber amplifier (EDFA), or the like. The optical fiber amplifier is characterized in terms of being able to amplify optical signals having a plurality of wavelengths as they are in a batch even when the optical signals are input, like the relay amplifier 30 of the network configuration shown in FIG. 2. In addition, even if the input level of the optical signals with respect to the optical fiber amplifier varies, the optical fiber amplifier equipped with an automatic power control (APC) function can perform control such that the output level of the optical signals is maintained at a constant level if the variation is within an allowable range.

The optical wavelength multiplexing unit 20 combines two optical signals having different wavelengths. The optical wavelength multiplexing unit 20 is a filter circuit capable of combining optical signals, such as a WDM filter, for example. The optical wavelength multiplexing unit 20 combines the optical signal having the wavelength $\lambda 1$ output from the optical transmitting unit 11 and the optical signal having the wavelength $\lambda 2$ output from the optical transmitting unit 13. The optical wavelength multiplexing unit 20 sends out the combined signal to the relay amplifier 30 in the first stage.

The relay amplifier 30 in the first stage receives the combined signal sent out from the optical wavelength multiplexing unit 20. The relay amplifier 30 in the subsequent stage receives the combined signal sent from the relay amplifier 30 in the one-previous stage. Each of the relay amplifiers 30 amplifies the received combined signal. Each of the relay amplifiers 30 sends out the amplified combined signal to a device in the subsequent stage (i.e., the relay amplifier 30 in the one-subsequent stage or to the access amplifier 40 in the section of the access NW.

Meanwhile, commonly, a PON configuration is applied to the access NW in order to divide optical signals (combined signals) received from the relay amplifiers 30 to a plurality of subscribers domes.

The access amplifier 40 is an amplifier that is installed for the purpose of, for example, compensating for loss resulting from division of optical signals in the PON configuration. The access amplifier 40 receives the optical signals (combined signals) sent out from the relay amplifiers 30. The access amplifier 40 amplifies the received optical signals. In addition, the access amplifier 40 sends out the amplified optical signals to the optical receiving units 50 and the optical receiving units 51 via the PON, which is constructed in the subsequent stage of the access amplifier 40.

The optical receiving units 50 are each installed at subscribers □homes, for example, and terminate the optical signals having the wavelength $\lambda 1$. In addition, the optical receiving units 51 are each installed at subscribers □homes, for example, and terminate the optical signals having the wavelength $\lambda 2$. The optical receiving units 50 can receive the optical signals having the wavelength $\lambda 1$ sent out from the optical transmitting unit 11 for the existing broadcasting. In addition, the optical receiving units 51 can receive the optical signals having the wavelength $\lambda 2$ output from the optical transmitting unit 13 that supports the new 4K/8K satellite broadcasting.

Note that, although FIG. 2 shows one optical receiving unit 50 and one optical receiving unit 51 for making it easier to view the diagram, in reality, at least one of the optical receiving unit 50 and the optical receiving unit 51 is installed at a plurality of subscribers □homes.

[Configuration of Quality Monitoring]

Hereinafter, signal quality monitoring will be described.

Figure 5:
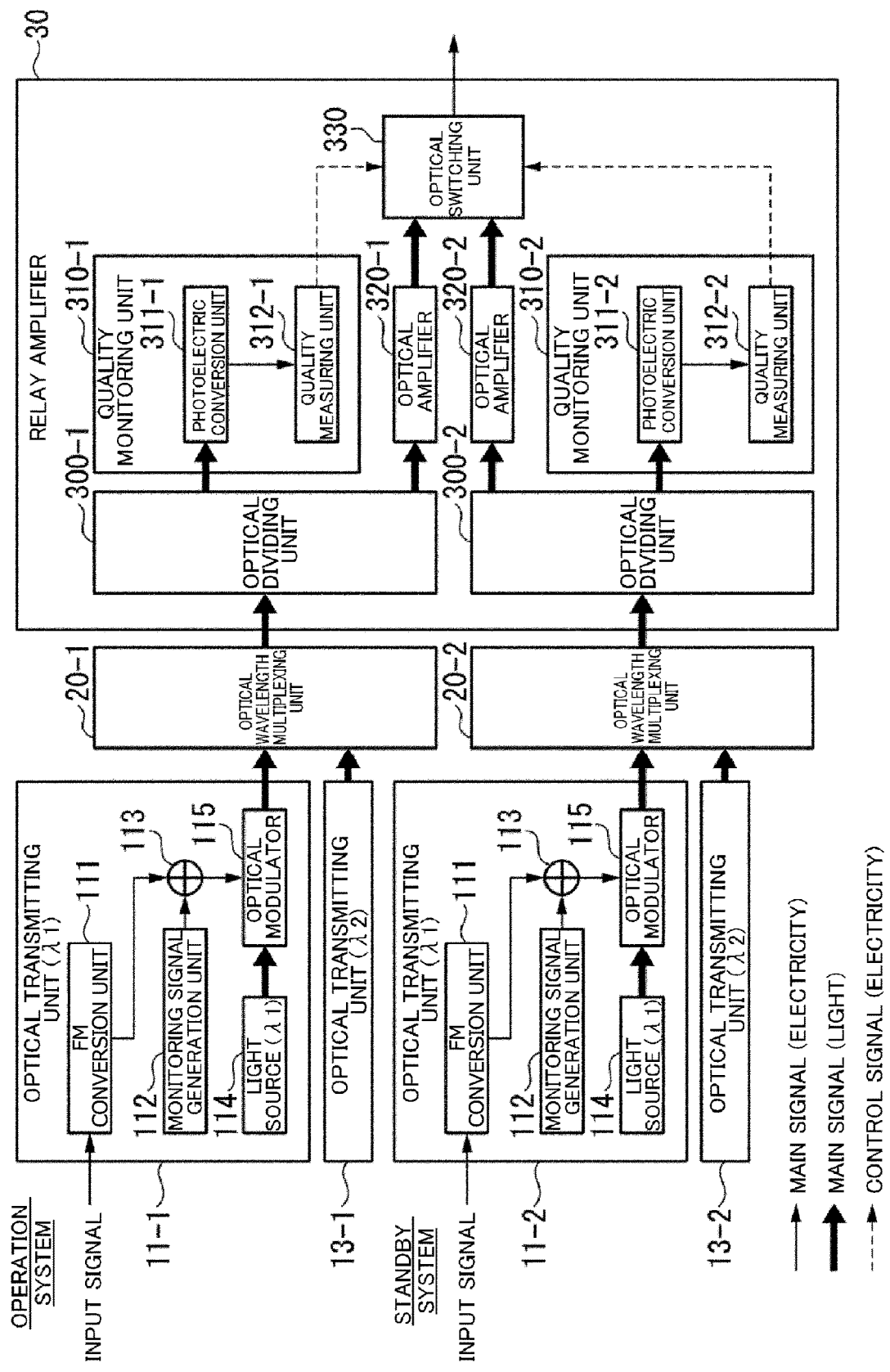
FIG. 5 is a block diagram showing a configuration of transmission quality monitoring of an optical transmission system according to an embodiment of the present invention.

FIG. 5 is a block diagram showing a configuration of transmission quality monitoring by the optical transmission system according to an embodiment of the present invention. FIG. 5 shows a configuration of an optical transmission system in which the section from the optical transmitting unit 11 and the optical transmitting unit 13 to the optical amplifier of the relay amplifier 30 is made redundant in the optical transmission system having the network configuration shown in FIG. 2. FIG. 5 also shows a configuration in which the headend 10, the headend 12, and the devices from the relay amplifier 30 on the second stage are omitted from the network configuration shown in FIG. 2.

The optical transmission system is configured to include an optical transmitting unit 11-1, an optical transmitting unit 11-2, an optical transmitting unit 13-1, an optical transmitting unit 13-2, an optical wavelength multiplexing unit 20-1, an optical wavelength multiplexing unit 20-2, and a relay amplifier 30 as shown in FIG. 5. The optical transmitting unit 11-1 and the optical transmitting unit 13-1 are optical transmitting units of the operation system. The optical transmitting unit 11-2 and the optical transmitting unit 13-2 are optical transmitting units of the standby system.

The optical transmitting unit 11-1 is an optical transmitting unit for existing broadcasting. The optical transmitting unit 11-1 is configured to include an FM conversion unit 111, a monitoring signal generation unit 112, a multiplexing unit 113 (a multiplexer), a light source 114, and an optical modulator 115 as shown in FIG. 5.

The FM conversion unit 111 receives an electric signal sent out from the headend 10 which is a headend for the existing broadcasting. The electric signal is a frequency multiplexed signal. The FM conversion unit 111 converts received frequency multiplexed signals into a broadband FM signal in a batch. The FM conversion unit 111 outputs the FM signal to the optical modulator 115.

The monitoring signal generation unit 112 generates a monitoring signal. The monitoring signal generation unit 112 outputs the generated monitoring signal to the multiplexing unit 113 as a light intensity modulation signal.

The multiplexing unit 113 acquires the monitoring signal output from the monitoring signal generation unit 112. The multiplexing unit 113 multiplexes the acquired monitoring signal with the FM signal output from the FM conversion unit 111 to the optical modulator 115.

The light source 114 outputs light with the wavelength $\lambda 1$ to the optical modulator 115. The light source 114 is configured to include a semiconductor laser, for example.

The optical modulator 115 acquires the FM signal output from the FM conversion unit 111 and then multiplexed with the monitoring signal by the monitoring signal generation unit 112. In addition, the optical modulator 115 receives the light with the wavelength $\lambda 1$ output from the light source 114. The optical modulator 115 converts the acquired FM signal into an optical signal having the wavelength $\lambda 1$. Then, the optical modulator 115 sends out the corresponding optical signal to the optical transmission path constructed with optical fibers.

Because the configuration of the optical transmitting unit 11-2 that is the redundant optical transmitting unit of the standby system is basically similar to that of the optical transmitting unit 11-1 that is an optical transmitting unit of the operation system described above, description thereof is omitted.

The optical transmitting unit 13-1 is an optical transmitting unit that supports the new 4K/8K satellite broadcasting. Although description of the configuration of the optical transmitting unit 13-1 is omitted in FIG. 5, the configuration is basically similar to that of the optical transmitting unit 13-1. Similarly to the optical transmitting unit 11-1 described above, the optical transmitting unit 13-1 is configured to include an FM conversion unit (not shown), a monitoring signal generation unit (not shown), a multiplexing unit (not shown), a light source (not shown), and an optical modulator (not shown).

However, the FM conversion unit (not shown) of the optical transmitting unit 13-1 receives an electric signal sent out from the headend 12 that is a headend that supports the new 4K/8K satellite broadcasting. In addition, the light source (not shown) of the optical transmitting unit 13-1 outputs light with the wavelength $\lambda 2$ to the optical modulator 115. Further, the optical modulator (not shown) of the optical transmitting unit 13-1 converts the obtained FM signal into an optical signal having the wavelength $\lambda 2$.

In addition, a monitoring signal generated by the monitoring signal generation unit 112 of the optical transmitting unit 11-1 of the operation system and a monitoring signal generated by the monitoring signal generation unit (not shown) of the optical transmitting unit 11-2 of the standby system are different monitoring signals. More specifically, the frequencies of both monitoring signals do not overlap the FM signal spectrum, but are different from each other.

Because the configuration of the optical transmitting unit 13-2 that is the redundant optical transmitting unit of the standby system is basically similar to that of the optical transmitting unit 13-1 that is an optical transmitting unit of the operation system described above, description thereof is omitted.

The optical wavelength multiplexing unit 20-1 combines the optical signal having the wavelength $\lambda 1$ sent out from the optical modulator 115 of the optical transmitting unit 11-1 and the optical signal having the wavelength $\lambda 2$ sent out from the optical modulator (not shown) of the optical transmitting unit 13-1. The optical wavelength multiplexing unit 20-1 is a filter circuit capable of combining optical signals, such as a WDM filter, for example. The optical wavelength multiplexing unit 20-1 sends out the combined signal obtained by combining the optical signal having the wavelength $\lambda 1$ and the optical signal having the wavelength $\lambda 2$ to the relay amplifier 30.

Because the configuration of the optical wavelength multiplexing unit 20-2 that is a redundant optical wavelength multiplexing unit of the standby system is similar to that of the optical wavelength multiplexing unit 20-1 that is the optical wavelength multiplexing unit of the operation system described above, the description thereof is omitted.

The relay amplifier 30 is configured to include an optical dividing unit 300-1, an optical dividing unit 300-2, a quality monitoring unit 310-1, a quality monitoring unit 310-2, an optical amplifier 320-1, an optical amplifier 320-2, and an optical switching unit 330 as shown in FIG. 5. The optical dividing unit 300-1, the quality monitoring unit 310-1, and the optical amplifier 320-1 are functional units of the operation system. In addition, the optical dividing unit 300-2, the quality monitoring unit 310-2, and the optical amplifier 320-2 are functional units of the standby system.

The optical dividing unit 300-1 receives a combined signal sent out from the optical wavelength multiplexing unit 20-1. The optical dividing unit 300-1 divides the received combined signal and outputs the signal to the quality monitor unit 310-1 and the optical amplifier 320-1. The optical dividing unit 300-1 is a filter circuit capable of combining optical signals, such as a WDM filter, for example.

The quality monitoring unit 310-1 monitors the signal quality of the combined signal sent out from the optical transmitting unit 11-1. The quality monitoring unit 310-1 is configured to include a photoelectric conversion unit 311-1 (a photoelectric converter) and a quality measuring unit 312-1 (a measuring instrument) as shown in FIG. 5.

The photoelectric conversion unit 311-1 acquires the combined signal output from the optical dividing unit 300-1. The photoelectric conversion unit 311-1 converts the acquired combined signal as an optical signal to an electric signal. The photoelectric conversion unit 311-1 outputs the electric signal to the quality measuring unit 312-1.

The quality measuring unit 312-1 acquires the electric signal output from the photoelectric conversion unit 311-1. The quality measuring unit 312-1 measures the signal quality of the monitoring signal generated by the monitoring signal generating unit 112 of the optical transmitting unit 11-1 and the signal quality of the monitoring signal generated by the monitoring signal generating unit (not illustrated) of the optical transmitting unit 13-1, respectively, based on the acquired electric signal. The quality measuring unit 312-1 outputs control information indicating the measurement result to the optical switching unit 330.

The optical amplifier 320-1 acquires the combined signal output from the optical dividing unit 300-1. The optical amplifier 320-1 amplifies the acquired combined signal. The optical amplifier 320-1 outputs the amplified combined signal to the optical switching unit 330.

Configurations of the optical dividing unit 300-2, the quality monitoring unit 310-2, the photoelectric conversion unit 311-2, the quality measuring unit 312-2, and the optical amplifier 320-2 that are redundant functional units of the standby system are basically similar to those of the optical dividing unit 300-1, the quality monitoring unit 310-1, the photoelectric conversion unit 311-1, the quality measuring unit 312-1, and the optical amplifier 320-1 that are functional units of the operation system described above, and thus the description thereof is omitted. However, the optical dividing unit 300-2 receives the combined signal sent out from the optical wavelength multiplexing unit 20-2 which is the optical wavelength multiplexing unit of the standby system.

The optical switching unit 330 acquires a control signal output from the quality measuring unit 312-1 and a control signal output from the quality measuring unit 312-2. In addition, the optical switching unit 330 acquires an optical signal output from the optical amplifier 320-1 and an optical signal output from the optical amplifier 320-2.

The optical switching unit 330 performs switching between the operation system and the standby system based on the control signal output from the quality measuring unit 312-1 and the control signal output from the quality measuring unit 312-2. Specifically, for example, when a value indicating the signal quality of the monitoring signal based on the control signal output from the quality measuring unit 312-1 is equal to or less than a predetermined threshold, the optical switching unit 330 performs switching from the operation system to the standby system. In addition, for example, when a value indicating the signal quality of the monitoring signal based on the control signal output from the quality measuring unit 312-2 is equal to or less than a predetermined threshold, the optical switching unit 330 performs switching from the standby system to the operation system.

When switching is made to the operation system, the optical switching unit 330 sends out the amplified combined signal output from the optical amplifier 320-1 to a device in the subsequent stage (that is, the relay amplifier 30 in the subsequent stage or the access amplifier 40). In addition, when switching is made to the standby system, the optical switching unit 330 sends out the amplified combined signal output from the optical amplifier 320-2 to a device in the subsequent stage (that is, the relay amplifier 30 in the subsequent stage or the access amplifier 40).

In the optical transmitting units 11 (11-1 and 11-2) of the related art shown in FIG. 3, the monitoring signal generated by the monitoring signal generating unit 112 is multiplexed with the electric signal in the preceding stage of the FM converting unit 111. On the other hand, in the optical transmitting unit of the present embodiment, the monitoring signal generated by the monitoring signal generating unit 112 is multiplexed with the FM signal by the multiplexing unit 113 in the subsequent stage of the FM conversion unit 111 as shown in FIG. 5.

In this way, in the optical transmission system of the related art, FM conversion processing is performed on the electric signal (input signal) multiplexed with the monitoring signal. In the optical transmission system of the related art, FM conversion processing is also performed on a monitoring signal, and thus it is necessary to perform FM demodulation at each of the wavelengths (the wavelength λ1 and the wavelength λ2) in the relay amplifier 30, as shown in FIG. 3. In addition, in the optical transmission system of the related art, it is necessary to measure the signal quality of the monitoring signal by the quality monitoring units 310 (310-1 and 310-3, and 310-2 and 310-4) provided for each wavelength as shown in FIG. 4.

On the other hand, in the optical transmission system according to the present embodiment, FM conversion processing is performed on the electric signal (input signal), and then the monitoring signal is multiplexed with the FM signal as shown in FIG. 5. Because the FM conversion processing is not performed on the monitoring signal, reception with a photodiode (PD) using the intensity modulation/direct detection (IMDD) method is possible in the optical transmission system of the present embodiment.

As a result, in the optical transmission system of the present embodiment, it is not necessary to perform FM demodulation when monitoring the signal quality of the monitoring signal, and an FM demodulation unit is not needed in the quality monitoring units 310 (310-1 and 310-2) as shown in FIG. 5. In addition, the optical transmission system of the present embodiment can measure the transmission quality at each wavelength without providing the quality monitoring units 310 for each wavelength. Thus, according to the optical transmission system of the present embodiment, it is possible to realize a low-cost and space-saving relay amplifier 30 (relay device).

[Operation of Optical Transmission System]

Figure 6:
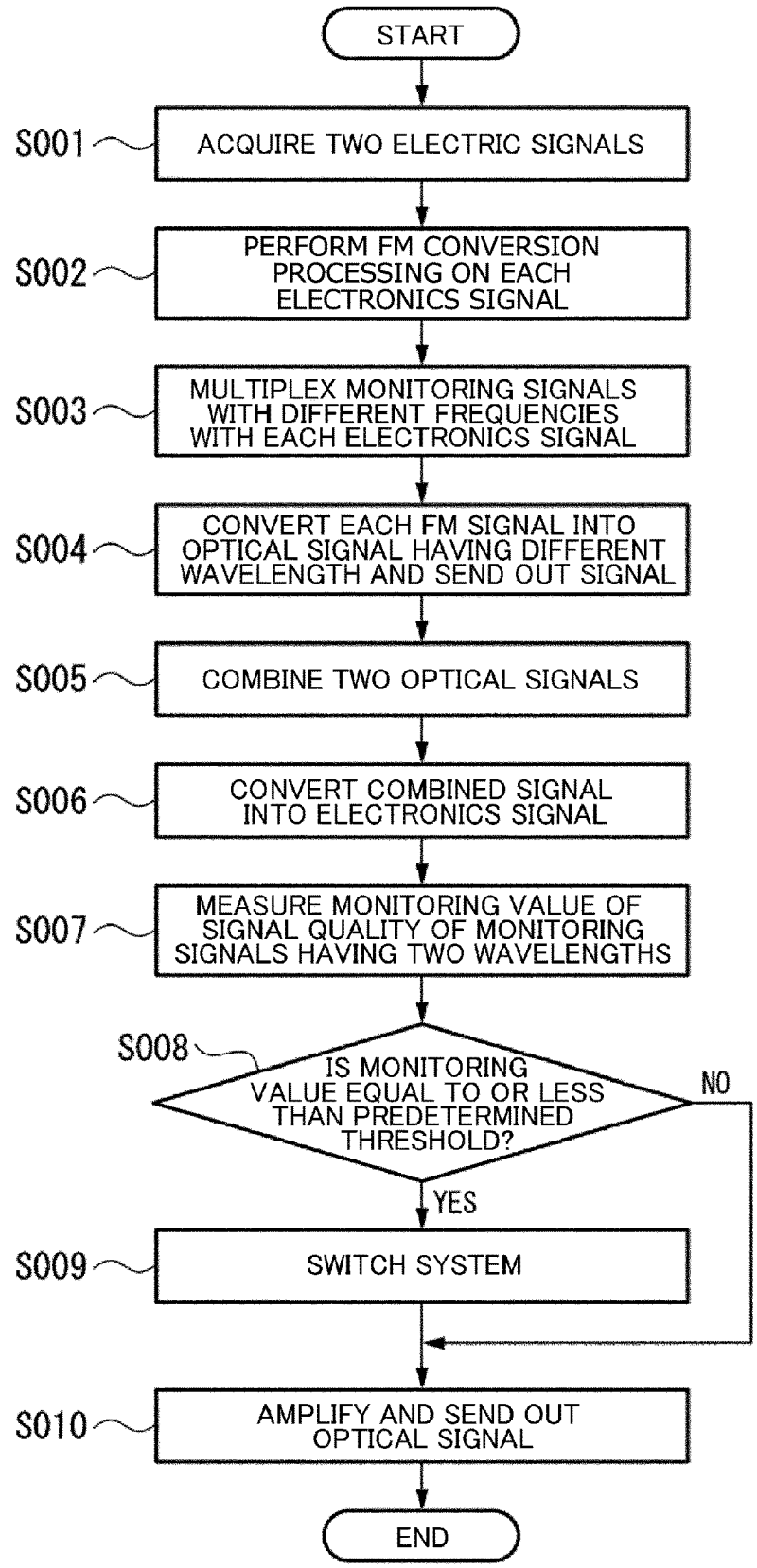
FIG. 6 is a flowchart showing an operation of the optical transmission system according to the embodiment of the present invention.

Hereinafter, an example of an operation of the optical transmission system will be described. FIG. 6 is a flowchart showing an operation of the optical transmission system according to the embodiment of the present invention.

First, the optical transmission system acquires two electric signals having different wavelengths from each other (step S001). For example, the FM conversion unit 111 of the optical transmitting unit 11-1 receives an electric signal transmitted from the headend 10 which is a headend for existing broadcasting. In addition, the FM conversion unit (not shown) of the optical transmitting unit 13-1 receives an electric signal sent out from the headend 12 that is a headend that supports the new 4K/8K satellite broadcasting.

Next, the optical transmission system performs FM conversion processing on each electric signal (step S002). For example, the FM conversion unit 111 of the optical transmitting unit 11-1 converts the received electric signals into a broadband FM signal in a batch. In addition, the FM conversion unit (not shown) of the optical transmitting unit 13-1 converts the received electric signals into a broadband FM signal in a batch.

Next, the optical transmission system multiplexes monitoring signals with mutually different frequencies with each of the electric signals (step S003). For example, the monitoring signal generating unit 112 of the optical transmitting unit 11-1 generates a monitoring signal with a first frequency, and multiplexes the generated monitoring signal with the first frequency with an FM signal. In addition, the monitoring signal generating unit (not shown) of the optical transmitting unit 13-1 generates a monitoring signal with a second frequency that is different from the first frequency, and multiplexes the generated monitoring signal with the second frequency with the FM signal.

Next, the optical transmission system converts each of the electric signals into optical signals having different wavelengths and sends the signals out (step S004). For example, the optical modulator 115 of the optical transmitting unit 11 converts the electric signal into an optical signal having the wavelength λ1, and sends out the optical signal to the optical transmission path constructed with optical fibers. In addition, the optical modulator (not shown) of the optical transmitting unit 13-1 converts the electric signal into an optical signal having the wavelength λ2, and sends out the optical signal to the optical transmission path constructed with optical fibers.

Next, the optical transmission system combines the two sent optical signals (step S005). For example, the optical wavelength multiplexing unit 20-1 combines the optical signal having the wavelength λ1 sent out from the optical modulator 115 of the optical transmitting unit 11-1 with the optical signal having the wavelength λ2 sent out from the optical modulator (not shown) of the optical transmitting unit 13-1.

Next, the optical transmission system converts the combined optical signal (combined signal) into an electric signal (step S006). For example, the photoelectric conversion unit 311-1 of the relay amplifier 30 converts the acquired combined signal from an optical signal into an electric signal.

Next, the optical transmission system measures monitoring values of the signal quality of monitoring signals having two wavelengths (step S007). For example, the quality measuring unit 312-1 measures the monitoring value of the signal quality of the monitoring signal generated by the monitoring signal generating unit 112 of the optical transmitting unit 11-1 and the monitoring value of the signal quality of the monitoring signal generated by the monitoring signal generating unit (not shown) of the optical transmitting unit 13-1, respectively, based on the acquired electric signal.

Next, if at least one of the monitoring values of the signal quality of the monitoring signals having the two wavelengths is equal to or less than a predetermined threshold (steps S008; Yes), the optical transmission system switches the system (step S009), then amplifies the optical signal, and sends out the amplified optical signal to the device in the subsequent stage (step S010). For example, if at least one of the monitoring values indicating the signal quality of the monitoring signals having two wavelengths based on a control signal output from the quality measuring unit 312-1 is equal to or less than a predetermined threshold, the optical switching unit 330 switches from the operation system to the standby system. Thus, the optical switching unit 330 sends out the combined signal output from the optical dividing unit 300-2 that is a standby system and amplified by the optical amplifier 320-2 to the device in the subsequent stage (that is, the relay amplifier 30 in the subsequent stage or the access amplifier 40).

On the other hand, if both the monitoring values of the signal quality of the monitoring signals having the two wavelengths are greater than the predetermined threshold (step S008; Yes), the optical transmission system amplifies the optical signal and sends out the amplified optical signal to the device in the subsequent stage (step S010). For example, if both the monitoring values indicating the signal quality of the monitoring signals having the two wavelengths based on the control signal output from the quality measuring unit 312-1 are greater than the predetermined threshold, the optical switching unit 330 sends out the combined signal output from the optical dividing unit 300-1 that is the operation system and amplified by the optical amplifier 320-1 to the device in the subsequent stage (that is, the relay amplifier 30 in the subsequent stage or the access amplifier 40).

The operation of the optical transmission system shown in the flowchart of FIG. 6 is completed as described above.

The optical transmission system according to the embodiment of the present invention is an optical transmission system of the FM conversion method for transmitting optical signals having two different wavelengths by using a common relay NW as described above. The optical transmitting units 11 (11-1 and 11-2) and the optical transmitting units 13 (13-1 and 13-2) multiplex each of main signals (electric signals) that have undergone FM patch conversion processing with monitoring signals with different frequencies, convert the main signals into optical signals, and send out the optical signals to the relay NWs, respectively.

Because the monitor signals are multiplexed with each of the main signals after the FM conversion processing, the relay amplifier 30 (relay device) can receive each of the optical signals having wavelengths in a batch and measure the quality of the monitor signals without performing FM demodulation processing. Thus, it is not necessary for the relay amplifier 30 (relay device) to be provided with a quality monitoring unit and an FM demodulation unit for each wavelength. Thus, in the optical transmission system according to the embodiment of the present invention, a low-cost and space-saving relay amplifier 30 (relay device) can be realized.

Note that, although it is assumed in the present embodiment that the optical wavelength multiplexing unit 20 (for example, a filter circuit such as a WDM filter) is provided outside the relay amplifier 30, the present invention is not limited thereto. For example, the relay amplifier 30 in the first stage may have a configuration in which the optical wavelength multiplexing unit 20 is built. In this case, a functional unit that corresponds to the function of the optical wavelength multiplexing unit 20 (that is, the function of combining the optical signal having the wavelength λ1 and the optical signal having the wavelength λ2) is provided in the optical dividing unit 300-1 and in the previous stage of the optical dividing unit 300-1 as shown in FIG. 5, for example.

According to the above-described embodiment, the optical transmission system includes a plurality of optical transmitting units (optical transmitters) and relay devices. For example, the optical transmitting units are the optical transmitting units 11-1 and 11-2 and the optical transmitting units 13-1 and 13-2 in the embodiment, and the relay devices are the relay amplifiers 30 in the embodiment.

In addition, according to the above-described embodiment, the plurality of optical transmitting units include a frequency modulation conversion unit (a frequency modulation converter), a multiplexing unit (a multiplexer), and an optical modulation unit (an optical modulator). For example, the frequency modulation conversion unit is the FM conversion unit 111 in the embodiment, the multiplexing unit is the multiplexing unit 113 in the embodiment, and the optical modulation unit is the optical modulator 115 in the embodiment.

The frequency modulation conversion unit converts an input signal into a frequency modulation (FM) signal through frequency modulation (FM) conversion processing. The multiplexing unit multiplexes monitoring signals with different frequencies with the frequency modulation signal. The optical modulation unit converts a frequency modulation signal that is an electric signal multiplexed with the monitoring signal into optical signals having different wavelengths. For example, different wavelengths are the wavelength λ1 and the wavelength λ2 in the embodiment.

In addition, according to the above-described embodiment, each of the relay device includes a photoelectric conversion unit (a photoelectric converter) and a measuring unit (a measuring instrument). For example, the photoelectric conversion unit includes the photoelectric conversion units 311-1 and 311-2 in the embodiment, and the measuring unit includes the quality measuring units 312-1 and 312-2 in the embodiment.

The photoelectric conversion units acquire a combined signal obtained by combining the optical signals having the different wavelengths, and convert the combined signal into an electric signal. The measuring units measure the transmission quality of a plurality of monitoring signals included in the electric signal. For example, the transmission quality of the monitoring signals has a monitoring value of the transmission quality of the monitoring signals in the embodiment.

Some configurations of the relay amplifiers 30, the optical transmitting units 11-1 and 11-2, and the optical transmitting units 13-1 and 13-2 according to the above-described embodiment may be realized by a computer. In such a case, a program for realizing the functions may be recorded in a computer-readable recording medium, and the program recorded on this recording medium may be read by a computer system to be executed. It is assumed that a "computer system" mentioned herein includes an OS and hardware such as a peripheral device. In addition, a "computer-readable recording medium" refers to a portable medium such as a flexible disk, a magneto-optical disk, a ROM, or a CD-ROM or a storage apparatus such as a hard disk that is built into the computer system. Furthermore, a "computer-readable recording medium" may also include a recording medium that dynamically holds a program for a short period of time such as a communication wire when the program is to be transmitted via a network such as the Internet or a communication line such as a telephone line as well as a recording medium that holds a program for a certain period of time such as a volatile memory inside a server or a computer system to become a client. Moreover, the program described above may be any of a program for realizing a part of the functions described above, a program capable of realizing the functions described above in combination with a program already recorded in a computer system, and a program for realizing the functions using a programmable logic device such as a field programmable gate array (FPGA).

Although the embodiments of the present invention have been described in detail with reference to the drawings, specific configurations are not limited to these embodiments, and designs and the like within a range that does not deviating from the gist of the present invention are also included.

REFERENCE SIGNS LIST

10 Headend
11 (11-1 and 11-2) Optical transmitting unit
12 Headend
13 (13-1 and 13-2) Optical transmitting unit
20 (20-1 and 20-2) Optical wavelength multiplexing unit
30 Relay amplifier
40 Access amplifier
50 Optical receiving unit
51 Optical receiving unit
111 FM conversion unit
112 Monitoring signal generation unit
113 Multiplexing unit
114 Light source
115 Optical modulator
300-1 and 300-2 Optical dividing unit
301 (301-1 and 301-2) Optical wavelength dividing unit
310-1 to 310-4 Quality monitoring unit
311-1 and 311-2 Photoelectric conversion unit
312-1 and 312-2 Quality measuring unit
320-1 and 320-2 Optical amplifier
330 Optical switching unit

The invention claimed is:

1. An optical transmission system comprising:
a plurality of optical transmitters; and
a relay device,
wherein the plurality of optical transmitters include
a frequency modulation converter configured to convert an input signal into a frequency modulation signal through frequency modulation conversion processing,
a multiplexer configured to multiplex monitoring signals, which are different in frequency from each other among the plurality of optical transmitters and are not frequency modulated, with the frequency modulation signal that is frequency modulated, and
an optical modulator configured to convert the frequency modulation signal that is an electric signal in which the monitoring signals are multiplexed, into optical signals having different wavelengths among the plurality of optical transmitters, and
the relay device includes
a photoelectric converter configured to acquire a combined signal obtained by combining optical signals having different wavelengths from each other and convert the combined signal into an electric signal, and
a measuring instrument configured to measure transmission quality of the plurality of monitoring signals with different frequencies included in the electric signal.

2. The optical transmission system according to claim 1, wherein the relay device further includes
an amplifier configured to amplify the combined signal.

3. The optical transmission system according to claim 1, wherein the plurality of optical transmitters include an operation-system optical transmitter that is an optical transmitter of an operation system, and a standby-system optical transmitter that is an optical transmitter of a standby system.

4. The optical transmission system according to claim 3, wherein the relay device further includes
a switcher configured to determine whether to transmit a combined signal obtained by combining the optical signal transmitted from the operation-system optical transmitter to an optical receiver or whether to transmit a combined signal obtained by combining the optical signal transmitted from the standby-system optical transmitter to the optical receiver based on the transmission quality measured by the measuring instrument.

5. The optical transmission system according to claim 1, further comprising:
an optical wavelength multiplexer configured to receive a first optical signal having the first wavelength transmitted from the first optical transmitter and a second optical signal having the second wavelength transmitted from the second optical transmitter, and
transmit an optical signal obtained by multiplexing the first optical signal with the second optical signal to the relay device.

6. The optical transmission system according to claim 5, wherein the optical wavelength multiplexer includes a wavelength division multiplexing filter.

7. A transmission quality monitoring method comprising:
in which a plurality of optical transmitters converting an input signal into a frequency modulation signal through frequency modulation conversion processing;
in which the plurality of optical transmitters multiplexing monitoring signals, which are different in frequency from each other among the plurality of optical transmitters and are not frequency modulated, with the frequency modulation signal that is frequency modulated;
in which the plurality of optical transmitters converting the frequency modulation signal that is an electric signal in which the monitoring signals are multiplexed, into optical signals having different wavelengths among the plurality of optical transmitters;
in which a relay device acquiring a combined signal obtained by combining the optical signals having the different wavelengths from each other and converting the combined signal into an electric signal; and
in which the relay device measuring transmission quality of the plurality of monitoring signals with different frequencies included in the electric signal.

8. An optical transmitter comprising:
a frequency modulation converter configured to convert an input signal into a frequency modulation signal through frequency modulation conversion processing;
a multiplexer configured to multiplex monitoring signals which are different in frequency from each other among a plurality of optical transmitters and are not frequency modulated, with the frequency modulation signal that is frequency modulated; and
an optical modulator configured to convert the frequency modulation signal that is an electric signal in which the monitoring signals are multiplexed, into optical signals having different wavelengths among the plurality of optical transmitters.

9. The optical transmission system according to claim 3, wherein the relay device further includes
a switcher configured to transmit, based on the measured transmission quality of the plurality of monitoring signals, either the combined signal of the operation-system optical transmitter or the combined signal of the standby-system optical transmitter to the optical receiver.

\* \* \* \* \*